(12) United States Patent
Hall

(10) Patent No.: US 7,327,462 B2
(45) Date of Patent: Feb. 5, 2008

(54) METHOD AND APPARATUS FOR DIRECT DETECTION OF SIGNALS FROM A DIFFERENTIAL DELAY HETERODYNE INTERFEROMETRIC SYSTEM

(75) Inventor: David B. Hall, La Crescenta, CA (US)

(73) Assignee: Litton Systems, Inc., Los Angeles, CA (US)

( * ) Notice: Subject to any disclaimer, the term of this patent is extended or adjusted under 35 U.S.C. 154(b) by 343 days.

(21) Appl. No.: 11/206,333

(22) Filed: Aug. 17, 2005

(65) Prior Publication Data

US 2007/0041020 A1    Feb. 22, 2007

(51) Int. Cl.
*G01B 9/02* (2006.01)

(52) U.S. Cl. ............... 356/478; 356/477; 250/227.19; 250/227.27

(58) Field of Classification Search ............... 356/477, 356/478; 250/227.19, 227.27
See application file for complete search history.

(56) References Cited

U.S. PATENT DOCUMENTS

| | | | |
|---|---|---|---|
| 4,752,132 A | 6/1988 | Pavlath | 356/345 |
| 4,848,906 A | 7/1989 | Layton | 356/345 |
| 5,206,924 A | 4/1993 | Kersey | 385/24 |
| 5,821,426 A | 10/1998 | Uchiyama | 73/800 |
| 5,852,507 A | 12/1998 | Hall | 359/192 |
| 5,917,597 A | 6/1999 | Hall et al. | 356/345 |
| 5,929,990 A * | 7/1999 | Hall | 356/519 |
| 5,949,740 A | 9/1999 | Hall | 367/149 |
| 5,995,207 A | 11/1999 | Hall et al. | 356/5.09 |
| 6,038,926 A | 3/2000 | Frederick et al. | 73/705 |
| 6,064,630 A | 5/2000 | Fersht et al. | 367/149 |
| 6,072,921 A | 6/2000 | Frederick et al. | 385/12 |
| 6,122,057 A | 9/2000 | Hall | 356/345 |
| 6,134,015 A | 10/2000 | Hall | 356/478 |
| 6,154,308 A | 11/2000 | Hall | 359/325 |
| 6,466,706 B1 * | 10/2002 | Go et al. | 385/12 |
| 6,678,211 B2 | 1/2004 | Vakoc | 367/149 |
| 6,687,011 B1 | 2/2004 | Lee et al. | 356/480 |
| 6,778,720 B1 | 8/2004 | Cekorich et al. | 385/15 |
| 2004/0257580 A1 * | 12/2004 | Hall | 356/478 |

OTHER PUBLICATIONS

International Search Report and Written Opinion from corresponding international application PCT/US2005/032635, mailed Mar. 3, 2006.

* cited by examiner

*Primary Examiner*—Tarifur Chowdhury
*Assistant Examiner*—Jonathan D Cook

(57) ABSTRACT

A direct detection method and apparatus for a fiber optic acoustic sensor array systems using an in-line Michelson sensor TDM array and an interferometric section having two acousto-optic modulators that produce optical pulses that are frequency shifted with respect to each other. Direct detection is accomplished according to the equation:

$$I(t)=A+B \cos [\phi_1-\phi_2+2\pi(f_1-f_2)t],$$

with the phase shift difference $\phi_1-\phi_2$ between two paths containing the acoustic phase information and the frequency $f_1-f_2$ being the difference between the RF frequencies for the two acousto-optic modulators.

21 Claims, 4 Drawing Sheets

METHOD AND APPARATUS FOR DIRECT DETECTION OF SIGNALS FROM A DIFFERENTIAL DELAY HETERODYNE INTERFEROMETRIC SYSTEM

BACKGROUND OF THE INVENTION

1. Field of the Invention

The present invention relates generally to improvements in fiber optic acoustic sensor array systems and more particularly pertains to a new and improved method and apparatus for detecting the signals from an array of fiber optic interferometric sensors for determining changes in a physical parameter measured by the individual sensors.

2. Description of Related Art

Mismatched fiber optic interferometers are commonly used as sensing elements in fiber optic sensor arrays for measuring changes in parameters such as fluid pressure, acceleration or magnetic field intensity, for example. Such sensing elements measure the phase delay between two optical paths having unequal path lengths. Typically, in time division multiplex (TDM) systems, a modulated optical signal is input to the sensor array and various demodulation techniques have been proposed and are used for correlating the signals from the array of sensors that produce the signals.

Common to all demodulation methods for fiber optic interferometric arrays, is the acquisition of an in-phase term proportional to the cosine of the interferometer phase shift and a quadrature term proportional to the sine of the interferometer phase shift. The sine of the sensor phase shift, is known as the quadrature term Q; and the cosine of the sensor phase shift is referred to as the in-phase term I. The angle of the phase shift is determined by calculating the ratio of Q/I, which is the tangent of the sensor phase shift. The amplitudes of the sine and cosine terms must be set equal by a normalization procedure to ensure the successful implementation of an arc tangent routine to find the sensor phase shift.

An interrogation method called differential delay heterodyne is one of a variety of methods used for fiber optic acoustic sensor array systems. It uses an in-line Michelson sensor time division multiplexed (TDM) array structure and a compensating interferometer section.

An example of such a system is shown in FIG. 1 as having a continuous wave laser 11 supplying signal energy to a pair of acousto-optic modulators 13, 15 that act as optical gates to produce pulses like the two optical pulses 1 and 2. Each acousto-optic modulator puts a unique frequency shift on the light energy from laser 11. This provides, for example, pulse 1 at a frequency shift of 105 MHz and pulse 2 at a frequency shift of 95 MHz for a difference frequency of 10 MHz between them. A delay coil 17 in series with the acousto-optic modulator 13 creates an optical path length difference between the pulse signal paths for the signal's output from the two acousto-optic modulators 13 and 15.

These output pulses travel down optical transmission line 16 in direction 43 to an in-line Michelson array with two hydrophone sections 19 and 21 located between mirrors 23(A), 24(B) and 25(C). Mirrors 23(A) and 24(B) are coupled to transmission line 16 by tap couplers having appropriate coupling ratios. The spacing between the three mirrors 23(A), 24(B) and 25(C) is selected to produce a reflected sequence of four pulses 35, 39, 41 and 37 traveling out of the Michelson array, in direction 45.

Return pulse 35 is effectively pulse 1 reflected from mirror 23(A). Pulse 35 can be labeled 1(A). Pulse 39 is an interference pulse signal that is a combination of pulse 1 reflected from mirror 24(B) and pulse 2 reflected from mirror 23(A). Return pulse 39 can be labeled (2A/1B). This pulse contains acoustic phase information from the hydrophone section. Pulse 41 is another interference pulse containing information from the combination of pulse 1 being reflected from mirror 25(C) and pulse 2 being reflected from mirror 24(B). Pulse 41, therefore, could be labeled (2B/1C). Pulse 37 is simply pulse 2 reflected from mirror 25(C). (Pulse 37 could be labeled pulse 2C.) The middle two pulses, 39 and 41, are the interference pulses that contain acoustic phase information 40 and 42, respectively from the two hydrophone sections. The system could be expanded to any number of hydrophones, so that for N hydrophones there are N+2 return pulse signals.

Pulses 35 and 37 contain no useful information.

These return pulse signals are demodulated in a receiver that contains a local oscillator 31 set at the difference frequency between the modulator frequencies of the two acousto-optic modulators 13 and 15. The local oscillator signal is mixed with the output signal from the photodiode detector 27 in mixer 29 to produce the cosine I and sine Q components of the optical signal. These cosine and sine components of the optical signal are then processed in the demodulator 33 to produce the signals representative of the change in parameter measured by the Michelson array.

The above example is only one of many available methods of demodulation known in the prior art. Other methods are shown and described in U.S. Pat. No. 6,154,308, U.S. Pat. No. 6,122,057, and U.S. Pat. No. 5,917,597. These patents show other examples of demodulation methods for fiber optic sensor arrays.

The present invention provides an improved method and apparatus for demodulating signal's from a fiber optic sensor array, by eliminating the need for a mixer and local oscillator, as shown in FIG. 1.

SUMMARY OF THE INVENTION

An apparatus and method for direct detection of signals from a differential delay heterodyne in line interferometric system that receives pulsed optical signals from an optical signal source, the pulsed optical signals being frequency shifted with respect to each signal path before being provided to the interferometric system. The interference signals from the interferometric system are detected and the signal intensity of each interference signal is measured at a plurality of points along the interference signal interval. The desired phase information is then calculated using the measured signal intensity points for each interference signal interval.

BRIEF DESCRIPTION OF THE DRAWINGS

The exact nature of this invention, as well as its objects and advantages, will become readily apparent from consideration of the following specification when considered in conjunction with the accompanying drawings which illustrates and describes a preferred embodiment of the invention, and in which like reference numerals designate like parts throughout the figures thereof and wherein.

DETAILED DESCRIPTION OF THE PREFERRED EMBODIMENTS

Figure 1:
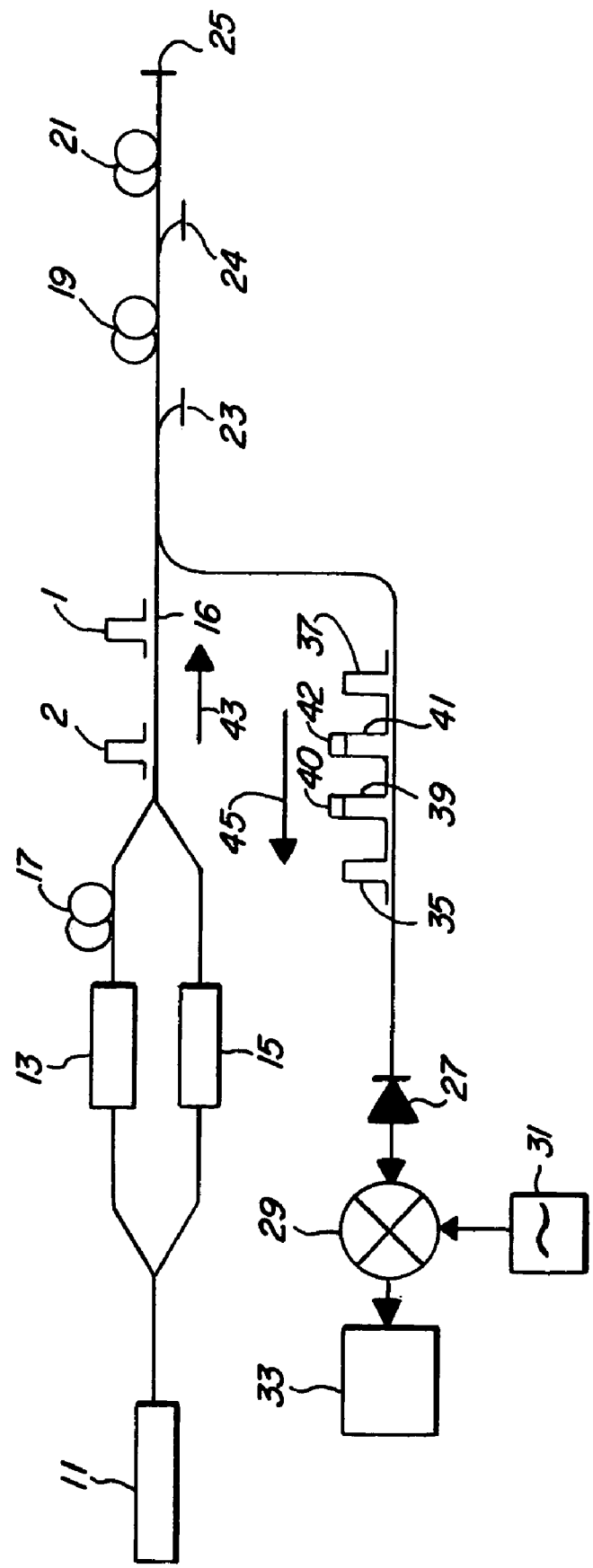
FIG. 1 is a schematic of a prior art differential delay heterodyne interferometer apparatus used with a fiber optic acoustic sensor array system.
Figure 2:
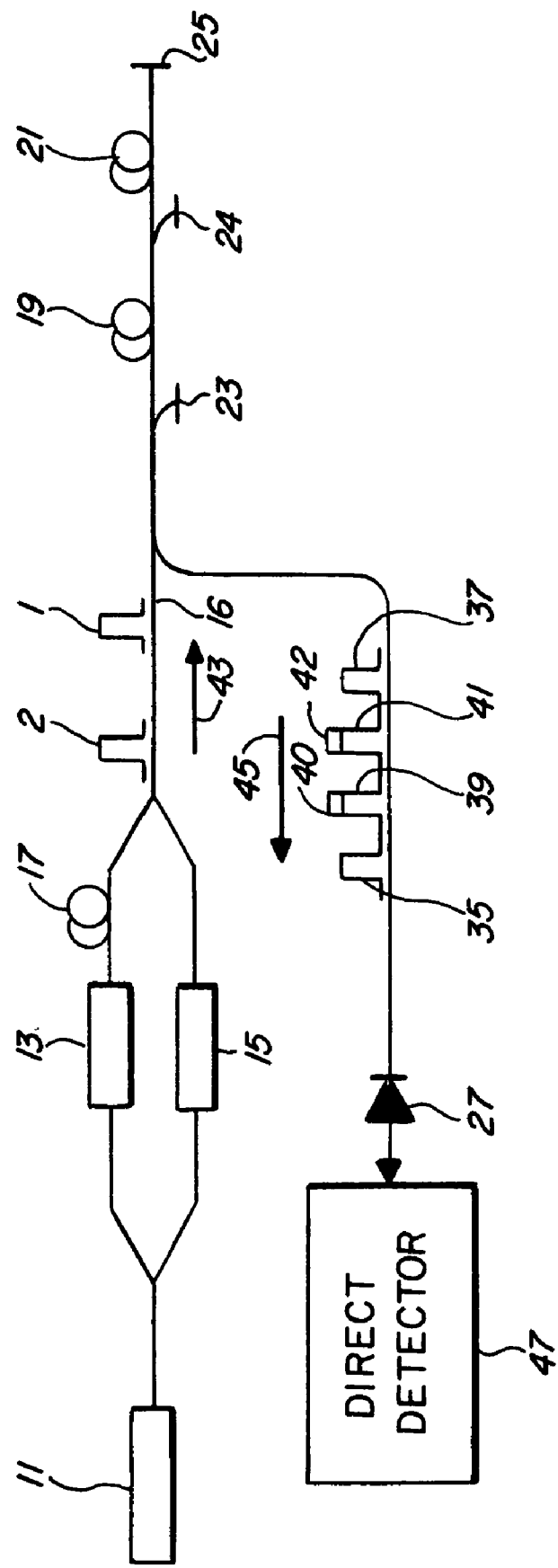
FIG. 2 is a schematic illustration of a preferred embodiment of the present invention.

As illustrated in FIG. 2, the direct detection method and apparatus of the present invention embodied in detector 47, receives the output signal from the photodiode detector 27 and proceeds to demodulate the received signals to extract the acoustic phase information without using a mixer, or a local oscillator.

Figure 3:
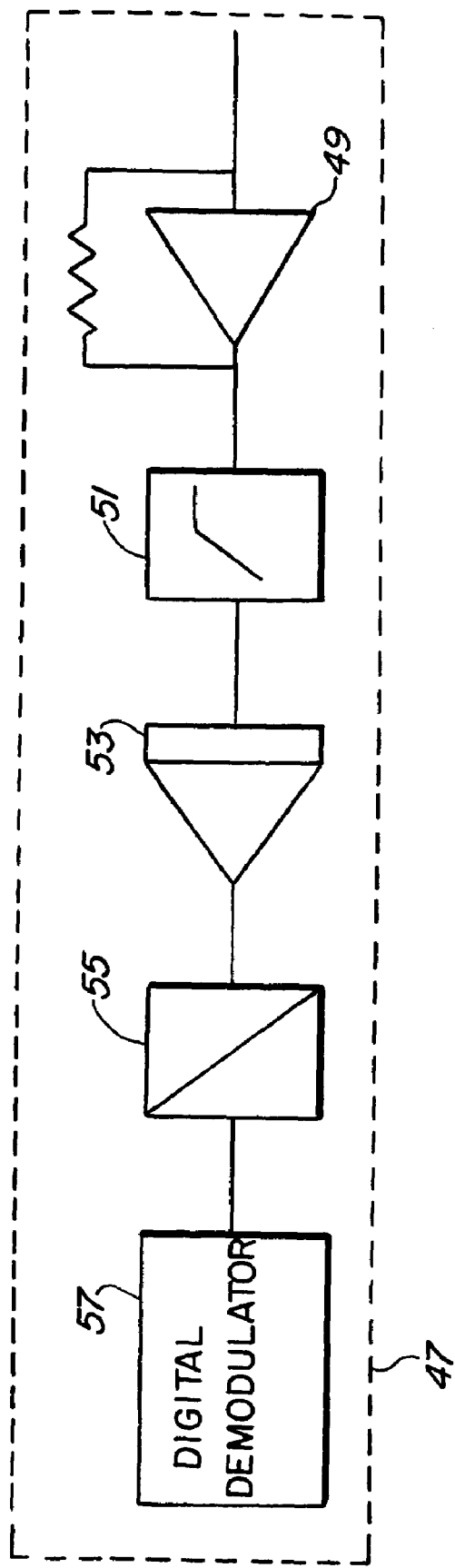
FIG. 3 is a block diagram of a direct detection apparatus used in FIG. 2.

FIG. 3 illustrates a preferred structure for a direct detector 47 that could be used in FIG. 2, as comprising a transimpedence amplifier 49 receiving the signals from the photodiode detector 27 (FIG. 2), providing the amplified signals to a low pass filter 51. The signals are then passed to a variable gain amplifier 53. The amplified signals are provided to an analog to digital (A/D) converter 55. The output of A/D converter 55 is provided to a digital demodulator 57.

Either output of the two beam interferometer of FIG. 2 pulse 39 (2A/1B) or pulse signal 41 (2B/1C), at the photodiode, is expressed by the equation:

$$I(t)=A+B \cos [\phi_1-\phi_2+2\pi(f_1-f_2)t)] \quad (1)$$

The phase shift difference $\phi_1-\phi_2$ between the two paths of the beam interferometer contains the acoustic phase information. The frequency difference $f_1-f_2$ is the frequency difference between the RF frequencies for the two acousto-optic modulators 13 and 15, 10 MHz in our example.

The pulse signal length or duration for each sensor return is typically 100 to 200 nanoseconds. With a frequency difference $f_1-f_2$ of 10 MHz, there will be one to two cycles of the 10 MHz waveform riding on the top 40 of return pulse 39 and on the top 42 of return pulse 41.

The pulse intensity I(t) can be captured every quarter cycle ($\pi/2$) to generate a series of values for the acquisition of the desired acoustic data according to the following equations:

$$I_0=A+B \cos [\phi_1-\phi_2] \quad (2)$$

$$I_1=A+B \cos [\phi_1-\phi_2+\pi/2]=A-B \sin [\phi_1-\phi_2] \quad (3)$$

$$I_2=A+B \cos [\phi_1-\phi_2+\pi]=A-B \cos [\phi_1-\phi_2] \quad (4)$$

$$I_3=A+B \cos [\phi_1-\phi_2+3\pi/2]=A+B \sin [\phi_1-\phi_2] \quad (5)$$

$$I_4=A+B \cos [\phi_1-\phi_2+2\pi]=I_0 \quad (6)$$

Ratios of the various sums and differences of the five pulse intensities $I_0$ to $I_4$ can be used to acquire the acoustic phase information according to one of the following equations:

$$\phi_1-\phi_2=a \tan [(I_3-I_1)/(I_0-I_2)] \quad (7)$$

$$\phi_1-\phi_2=a \tan [(I_3-I_1)/(I_1+I_3-2I_2)] \quad (8)$$

$$\phi_1-\phi_2=a \tan [(I_0+I_2-2I_1)/(I_0-I_2)] \quad (9)$$

Figure 4:
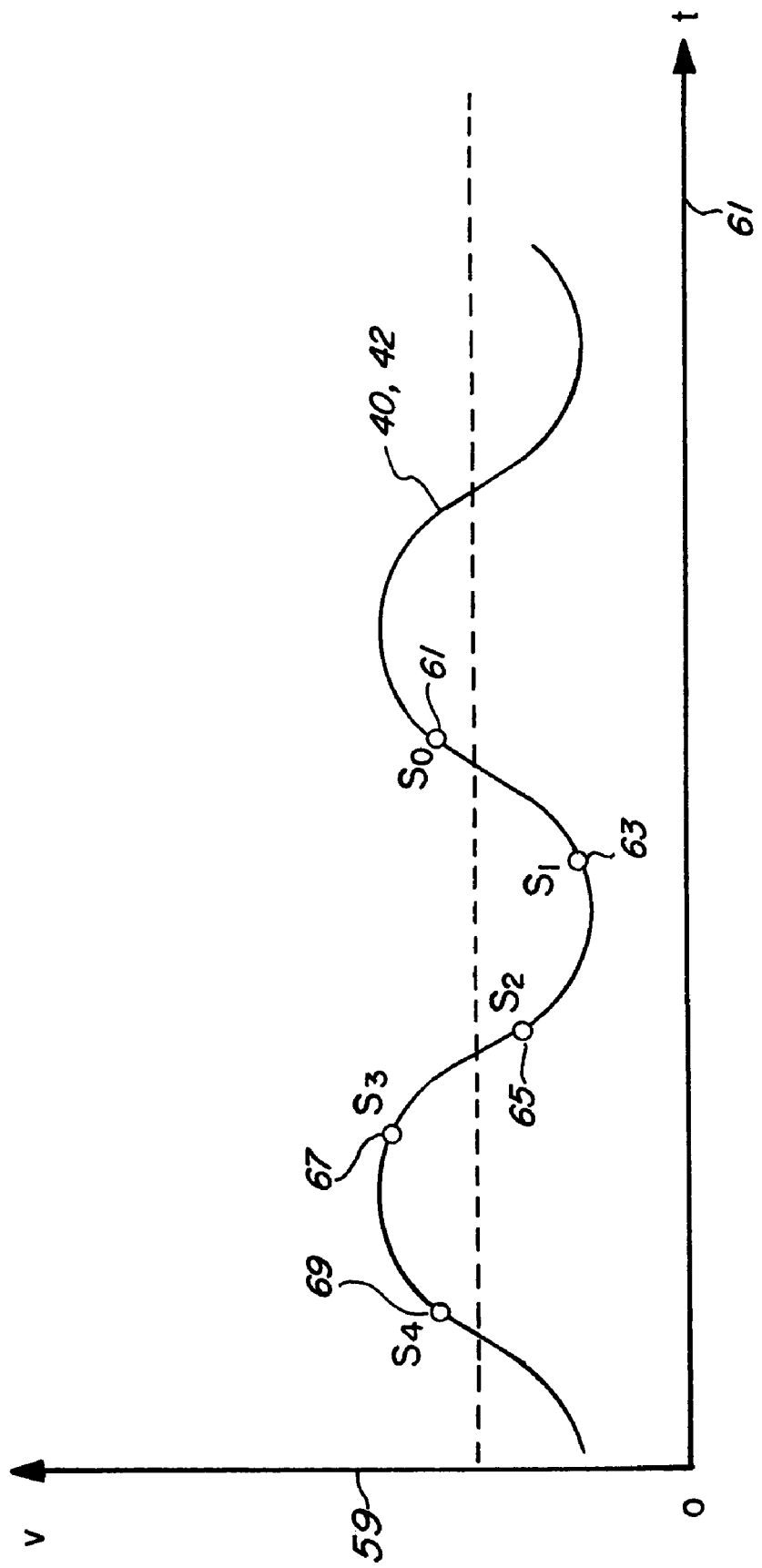
FIG. 4 is a signal diagram illustrating detection of a signal by the apparatus of FIG. 3.

FIG. 4 illustrates two cycles of a 10 MHz waveform riding on top of one of the return pulse signals. The two cycle waveform 40, 42 provides ample sampling points 61, 63, 65, 67, 69. The points $I_0$ 61 through $I_4$ 69 can be obtained in one cycle by sampling at $\pi/2$ intervals.

Four pulse intensities are required by equation (7). Only three pulse intensities are needed for equations (8) and (9). For a 10 MHz waveform with a period of 100 nanoseconds, the minimum of three signal levels can be determined from a 50 nanosecond half cycle. This is sufficient to determine the acoustic phase shift. By utilizing the multiple solutions for $\phi_1-\phi_2$ provided by equations (7), (8) and (9) and averaging these solutions, accuracy is increased.

$I_0(t)$ 61 and $I_4(t)$ 69, as can be seen from FIG. 4, are one cycle apart and should have the same signal level. Certain systems utilizing a larger number of sensors or having distances from the source or receiver to the sensor arrays that exceed certain limits, require the use of erbium doped fiber amplifiers. A characteristic of erbium doped fiber amplifiers is to place a ramp on top of each sensor return pulse.

This ramp on each sensor return pulse signal adds complexity to the demodulation process of the present invention. This ramp is usually quite small and can be modeled as a linear slope as indicated in the following equations:

$$I_0=A+B \cos [\phi_1-\phi_2] \quad (10)$$

$$I_1=(1+x)(A-B \sin [\phi_1-\phi_2]) \quad (11)$$

$$I_2=(1+2x)(A-B \cos [\phi_1-\phi_2]) \quad (12)$$

$$I_3=(1+3x)(A+B \sin [\phi_1-\phi_2]) \quad (13)$$

$$I_4=(1+4x)(A+B \cos [\phi_1-\phi_2]) \quad (14)$$

The linear slope factor x is only a few percent and can be expressed as follows:

$$X=(I_4-I_0)/4I_0$$

Substituting x into equations (11) through (14), we obtain:

$$S_0=I_0=A+B \cos [\phi_1-\phi_2] \quad (16)$$

$$S_1=4(I_0I_1)/(3I_0+I_4)=A-B \sin [\phi_1-\phi_2] \quad (17)$$

$$S_2=4(I_0I_2)/(2I_0+2I_4)=A-B \cos [\phi_1-\phi_2] \quad (18)$$

$$S_3=4(I_0I_3)/(I_0+3I_4)=A+B \sin [\phi_1-\phi_2] \quad (19)$$

$$S_4=I_0=A+B \cos [\phi_1-\phi_2] \quad (20)$$

The quantities $S_0$ through $S_4$ in equations (16) through (20) reduce to the quantities $I_0$ through $I_4$ in equations (2) through (6) at the limit of slope factor x=0.

Ratios of the various sums and differences of the five modified pulse intensities $S_k$ can be used to acquire the acoustic phase information. In utilizing equations (7), (8) and (9) with the modified pulse intensities we obtain:

$$\phi_1-\phi_2=a \tan [(S_3-S_1)/(S_0-S_2)] \quad (21)$$

$$\phi_1-\phi_2=a \tan [(S_3-S_1)/S_1+S_3-2S_2)] \quad (22)$$

$$\phi_1-\phi_2=a \tan [(S_0+S_2-2S_1)/(S_0-S_2)] \quad (23)$$

Thus, even when erbium doped fiber amplifiers are required for the system, the direct detection demodulation method of the present invention can be used to create the advantage of the multiple solutions provided by equations (21), (22) and (23) to allow for averaging of $\phi_1-\phi_2$ to increase accuracy of the result.

The mathematical manipulation of the return pulse signals discussed above are performed by the direct detector 47 of the present invention and specifically by the digital demodulator 57.

The direct detection demodulation method of the apparatus and method of the present invention eliminates the requirement to use a mixer and a local oscillator, thereby considerably simplifying the receiver architecture for differential delay heterodyne interferometer systems.

What is claimed is:

1. An apparatus for direct detection of signals from a differential delay heterodyne interferometric system, comprising:
   a coherent optical signal source;
   a compensator for receiving the optical signals from the coherent signal source and generating a plurality of pulses, frequency shifted with respect to each other;
   an in line interferometric array receiving the frequency shifted pulses and reflecting interference signals;
   a photodiode for detecting the interference signals; and
   a direct detector receiving the interference signals for measuring the intensity of a plurality of points along each interference signal and calculating the phase information using the measured intensity points.

2. The apparatus of claim 1 wherein said direct detector comprises:
   a transimpedence amplifier receiving the interference signals;
   a loss pass filter receiving the output of the transimpedence amplifier;
   a variable gain amplifier receiving the signal output from the filters;
   an analog to digital converter for sampling intensity of the waveform from the variable gain amplifier; and
   a digital demodulator for calculating the phase information.

3. The apparatus of claim 2 wherein the analog to digital converter samples the waveform at $\pi/2$ intervals.

4. The apparatus of claim 2 wherein the analog to digital converter samples each waveform for each pulse interval at a minimum of three points.

5. The apparatus of claim 4 wherein the direct detector acquires the desired phase information according to any one of the following equations:

$$\phi_1-\phi_2 = a\tan[(I_3-I_1)/(I_0-I_2)]$$

$$\phi_1-\phi_2 = a\tan[(I_3-I_1)/(I_1+I_3-2I_2)]$$

$$\phi_1-\phi_2 = a\tan[(I_0+I_2-2I_1)/(I_0-I_2)].$$

6. The apparatus of claim 2 wherein the analog to digital converter equates the signal intensity of each waveform for each pulse interval according to three or more of the following equations:

$$I_0 = A+B\cos[\phi_1-\phi_2]$$

$$I_1 = A+B\cos[\phi_1-\phi_2+\pi/2] = A-B\sin[\phi_1-\phi_2]$$

$$I_2 = A+B\cos[\phi_1-\phi_2+\pi] = A-B\cos[\phi_1-\phi_2]$$

$$I_3 = A+B\cos[\phi_1-\phi_2+3\pi/2] = A+B\sin[\phi_1-\phi_2]$$

$$I_4 = A+B\cos[\phi_1-\phi_2+2\pi] = I_0$$

where: A is an average signal amplitude, B is an interference signal amplitude, and $\phi_1-\phi_2$ is the desired phase shift.

7. The apparatus of claim 6 wherein the digital demodulator acquires the desired phase information according to any one of the following equations:

$$\phi_1-\phi_2 = a\tan[(I_3-I_1)/(I_0-I_2)]$$

$$\phi_1-\phi_2 = a\tan[(I_3-I_1)/(I_1+I_3-2I_2)]$$

$$\phi_1-\phi_2 = a\tan[(I_0+I_2-2I_1)/(I_0-I_2)].$$

8. The apparatus of claim 1 wherein the direct detector samples the interference signals at $\pi/2$ intervals.

9. The apparatus of claim 1 wherein the direct detector samples the interference signals for each pulse interval at a minimum of three points at $\pi/2$ intervals.

10. The apparatus of claim 1 wherein the direct detector samples the interference signals and equates each pulse interval sampled to three or more of the following equations:

$$I_0 = A+B\cos[\phi_1-\phi_2]$$

$$I_1 = A+B\cos[\phi_1-\phi_2+\pi/2] = A-B\sin[\phi_1-\phi_2]$$

$$I_2 = A+B\cos[\phi_1-\phi_2+\pi] = A-B\cos[\phi_1-\phi_2]$$

$$I_3 = A+B\cos[\phi_1-\phi_2+3\pi/2] = A+B\sin[\phi_1-\phi_2]$$

$$I_4 = A+B\cos[\phi_1-\phi_2+2\pi] = I_0$$

where: A is an average signal amplitude, B is an interference signal amplitude, and $\phi_1-\phi_2$ is the desired phase shift.

11. The apparatus of claim 2 wherein the analog to digital converter samples each waveform for each pulse interval and equates the samples to three or more of the following equations:

$$I_0 = A+B\cos[\phi_1-\phi_2]$$

$$I_1 = (1+x)(A-B\sin[\phi_1-\phi_2])$$

$$I_2 = (1+2x)(A-B\cos[\phi_1-\phi_2])$$

$$I_3 = (1+3x)(A+B\sin[\phi_1-\phi_2])$$

$$I_4 = (1+4x)(A+B\cos[\phi_1-\phi_2])$$

where A is an average signal amplitude, B is an interference signal amplitude, and $\phi_1-\phi_2$ is the desired phase shift, with x being a linear slope factor:

$$x = (I_4-I_0)/4I_0.$$

12. The apparatus of claim 11 wherein the digital demodulator acquires the desired phase information according to any one of the following equations:

$$\phi_1-\phi_2 = a\tan[(S_3-S_1)/(S_0-S_2)]$$

$$\phi_1-\phi_2 = a\tan[(S_3-S_1)/(S_1+S_3-2S_2)]$$

$$\phi_1-\phi_2 = a\tan[(S_0+S_2-2S_1)/(S_0-S_2)]$$

where:

$$S_0 = I_0$$

$$S_1 = 4(I_1I_1)/(3I_0+I_4)$$

$$S_2 = 4(I_0I_2)/(2I_0+2I_4)$$

$$S_3 = 4(I_0I_3)/(I_0+3I_4)$$

$$S_4 = I_0.$$

13. The apparatus of claim 1 wherein the direct detector samples the interference signals for each pulse interval and equates the sample signals to three or more of the following equations:

$$I_0 = A+B\cos[\phi_1-\phi_2]$$

$$I_1 = (1+x)(A-B\sin[\phi_1-\phi_2])$$

$$I_2 = (1+2x)(A-B\cos[\phi_1-\phi_2])$$

$$I_3 = (1+3x)(A+B\sin[\phi_1-\phi_2])$$

$$I_4 = (1+4x)(A+B\cos[\phi_1-\phi_2])$$

where A is an average signal amplitude, B is an interference signal amplitude, and $\phi_1-\phi_2$ is the desired phase shift, with x being a linear slope factor:

$$x=(I_4-I_0)/4I_0.$$

14. The apparatus of claim 13 wherein the direct detector acquires the desired phase information according to any one of the following equations:

$$\phi_1-\phi_2=a\tan[(S_3-S_1)/(S_0-S_2)]$$

$$\phi_1-\phi_2=a\tan[(S_3-S_1)/(S_1+S_3-2S_2)]$$

$$\phi_1-\phi_2=a\tan[(S_0+S_2-2S_1)/(S_0-S_2)]$$

where:

$$S_0=I_0$$

$$S_1=4(I_1I_1)/(3I_0+I_4)$$

$$S_2=4(I_0-I_2)/(2I_0+2I_4)$$

$$S_3=4(I_0I_3)/(I_0+3I_4)$$

$$S_4=I_0.$$

15. A method for direct detection of signals from a differential delay heterodyne in line interferometric system that receives pulsed optical signals from an optical signal source, the method comprising the steps:
  frequency shifting the pulsed optical signals with respect to each signal path and feeding the frequency shifted pulses into the interferometric system;
  detecting the interference signals from the interferometric system;
  measuring the signal intensity of a plurality of points along each interference signal interval; and
  calculating phase information using the measured intensity points.

16. The method of claim 15 wherein the signal intensity of the plurality of points along each interference signal interval is measured at $\pi/2$ intervals.

17. The method of claim 15 wherein the signal intensity is measured at a minimum of three points for each interference signal interval.

18. The method of claim 15 wherein the signal intensity of each interference signal interval is equated to three or more of the following equations:

$$I_0=A+B\cos[\phi_1-\phi_2]$$

$$I_1=A+B\cos[\phi_1-\phi_2+\pi/2]=A-B\sin[\phi_1-\phi_2]$$

$$I_2=A+B\cos[\phi_1-\phi_2+\pi]=A-B\cos[\phi_1-\phi_2]$$

$$I_3=A+B\cos[\phi_1-\phi_2+3\pi/2]=A+B\sin[\phi_1-\phi_2]$$

$$I_4=A+B\cos[\phi_1-\phi_2+2\pi]=I_0$$

where: A is an average signal amplitude, B is an interference signal amplitude, and $\phi_1-\phi_2$ is the desired phase shift.

19. The method of claim 18 wherein the phase information is determined according to any one of the following equations:

$$\phi_1-\phi_2=a\tan[(I_3-I_1)/(I_0-I_2)]$$

$$\phi_1-\phi_2=a\tan[(I_3-I_1)/(I_1+I_3-2I_2)]$$

$$\phi_1-\phi_2=a\tan[(I_0+I_2-2I_1)/(I_0-I_2)].$$

20. The method of claim 15 wherein the signal intensity of each interference signal interval is equated to three or more of the following equations:

$$I_0=A+B\cos[\phi_1-\phi_2]$$

$$I_1=(1+x)(A-B\sin[\phi_1-\phi_2])$$

$$I_2=(1+2x)(A-B\cos[\phi_1-\phi_2])$$

$$I_3=(1+3x)(A+B\sin[\phi_1-\phi_2])$$

$$I_4=(1+4x)(A+B\cos[\phi_1-\phi_2])$$

where A is an average signal amplitude, B is an interference signal amplitude, and $\phi_1-\phi_2$ is the desired phase shift, with x being a linear slope factor:

$$x=(I_4-I_0)/4I_0.$$

21. The method of claim 20 wherein the phase information is determined according to any one of the following equations:

$$\phi_1-\phi_2=a\tan[(S_3-S_1)/(S_0-S_2)]$$

$$\phi_1-\phi_2=a\tan[(S_3-S_1)/(S_1+S_3-2S_2)]$$

$$\phi_1-\phi_2=a\tan[(S_0+S_2-2S_1)/(S_0-S_2)]$$

where:

$$S_0=I_0$$

$$S_1=4(I_0I_1)/(3I_0+I_4)$$

$$S_2=4(I_0I_2)/(2I_0+2I_4)$$

$$S_3=4(I_0I_3)/(I_0+3I_4)$$

$$S_4=I_0.$$

* * * * *